United States Patent
Bitar

(10) Patent No.: US 9,440,736 B2
(45) Date of Patent: Sep. 13, 2016

(54) SPECIAL PERSONAL ELECTRIC HELICOPTER DEVICE WITH INTEGRAL WIND TURBINE RECHARGING CAPABILITY

(76) Inventor: Pete Bitar, Anderson, IN (US)

(*) Notice: Subject to any disclaimer, the term of this patent is extended or adjusted under 35 U.S.C. 154(b) by 0 days.

(21) Appl. No.: 13/480,431

(22) Filed: May 24, 2012

(65) Prior Publication Data

US 2012/0298790 A1   Nov. 29, 2012

Related U.S. Application Data

(60) Provisional application No. 61/490,343, filed on May 26, 2011.

(51) Int. Cl.
| | | |
|---|---|---|
| *B64C 27/10* | (2006.01) | |
| *B64C 27/12* | (2006.01) | |
| *B64C 39/02* | (2006.01) | |
| *B64D 27/24* | (2006.01) | |

(52) U.S. Cl.
CPC .............. *B64C 27/10* (2013.01); *B64C 27/12* (2013.01); *B64C 39/026* (2013.01); *B64D 27/24* (2013.01); *B64C 2201/027* (2013.01); *B64C 2201/042* (2013.01); *B64C 2201/108* (2013.01); *Y02T 50/62* (2013.01)

(58) Field of Classification Search
CPC ....... B64C 27/43; B64C 11/28; B64C 13/50; B64C 39/026; B60L 11/182
USPC ...................... 244/17.11, 8, 17.23, 17.27, 58
See application file for complete search history.

(56) References Cited

U.S. PATENT DOCUMENTS

| | | | | |
|---|---|---|---|---|
| 452,546 A | * | 5/1891 | Mitchell | 290/44 |
| 1,397,062 A | * | 11/1921 | Smith | 244/58 |
| 1,634,167 A | * | 6/1927 | Wilson | 244/58 |
| 2,461,348 A | * | 2/1949 | Pentecost | 244/17.23 |
| 2,486,059 A | * | 10/1949 | Pentecost | 416/115 |
| 2,953,321 A | | 9/1960 | Robertson et al. | |
| 3,029,047 A | * | 4/1962 | Jacobsen et al. | 244/17.11 |
| 3,034,746 A | * | 5/1962 | De Temple | 244/17.11 |
| 3,052,305 A | * | 9/1962 | Jones et al. | 416/21 |
| 3,138,350 A | | 6/1964 | Lovett, Jr. | |
| 3,272,457 A | * | 9/1966 | MacMillan | 244/17.11 |
| 3,426,982 A | * | 2/1969 | Markwood | 244/7 C |
| 3,617,020 A | * | 11/1971 | Gerstine et al. | 244/17.27 |
| 4,071,206 A | * | 1/1978 | Magill | 244/17.11 |
| 4,702,437 A | * | 10/1987 | Stearns, Jr. | 244/17.11 |
| 4,891,029 A | * | 1/1990 | Hutchinson | A63H 27/10 244/198 |
| 4,955,560 A | * | 9/1990 | Nishina et al. | 244/53 R |

(Continued)

*Primary Examiner* — Christopher P Ellis
*Assistant Examiner* — Jessica Wong
(74) *Attorney, Agent, or Firm* — Ritchison Law Offices, PC; John D Ritchison

(57) ABSTRACT

Disclosed is a Personal Electric Helicopter device with an integral wind turbine recharging capability. The device is a relatively small, lighter weight powered aircraft capable of vertical take-offs and propulsion across various terrain at low altitudes. The device is uniquely capable of re-charging its power source by connection to an electrical grid or by using its uplift components as a wind turbine for re-charging. The preferred embodiment is comprised of a rechargeable uplift and propulsion power system with components and features; a frame structure to carry an operator and/or payload; a means to connect the structure to the power system; and a means to control the uplift and propulsion system wherein the vehicle may be used to elevate and propel a payload at low altitudes across various terrains and may be positioned to reverse power the wind turbine to recharge the batteries.

6 Claims, 13 Drawing Sheets

(56) References Cited

U.S. PATENT DOCUMENTS

| | | |
|---|---|---|
| 5,779,188 A | 7/1998 | Frick |
| 5,842,667 A | 12/1998 | Jones |
| 6,242,881 B1* | 6/2001 | Giordano .................. 318/700 |
| 6,460,802 B1* | 10/2002 | Norris .................... 244/17.11 |
| 6,719,244 B1 | 4/2004 | Gress |
| 6,845,942 B2 | 1/2005 | Paul |
| 6,886,776 B2 | 5/2005 | Wagner et al. |
| 6,969,027 B2 | 11/2005 | Ishiba |
| 7,182,295 B2 | 2/2007 | Redmond |
| 7,364,114 B2 | 4/2008 | Wobben |
| 7,699,260 B2 | 4/2010 | Hughey |
| 2002/0003188 A1* | 1/2002 | Moshier ........................ 244/4 R |
| 2002/0125368 A1* | 9/2002 | Phelps et al. .............. 244/17.23 |
| 2004/0007644 A1* | 1/2004 | Phelps et al. .............. 244/17.11 |
| 2005/0098682 A1* | 5/2005 | Pai .......................... B64C 27/10 |
| | | 244/17.11 |
| 2005/0103537 A1* | 5/2005 | Michaud et al. ............... 180/2.2 |
| 2007/0114325 A1* | 5/2007 | Baldwin ............ B64C 29/0033 |
| | | 244/17.11 |
| 2007/0262197 A1* | 11/2007 | Phelps et al. .............. 244/17.11 |
| 2008/0184906 A1* | 8/2008 | Kejha .................. B64C 39/024 |
| | | 102/374 |
| 2009/0145997 A1* | 6/2009 | Kissel, Jr. .................. 244/17.23 |
| 2011/0101157 A1* | 5/2011 | Kissel, Jr. .................. 244/17.15 |

* cited by examiner

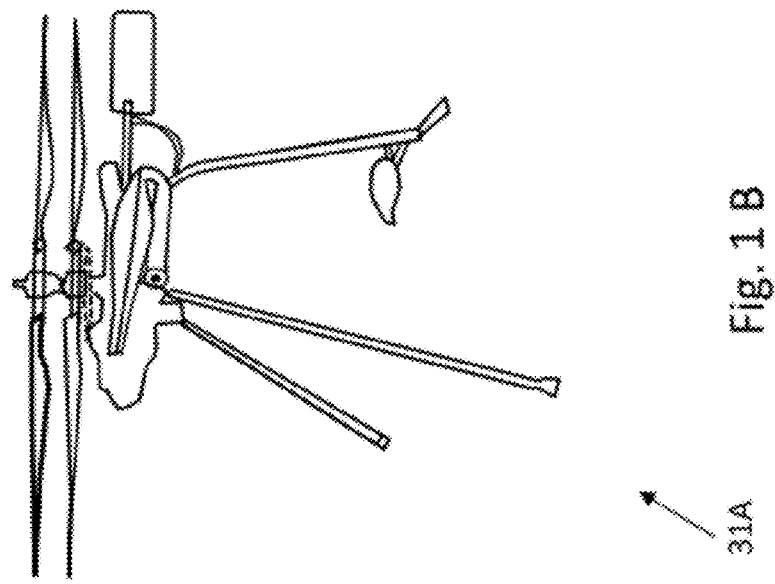
Fig. 1B
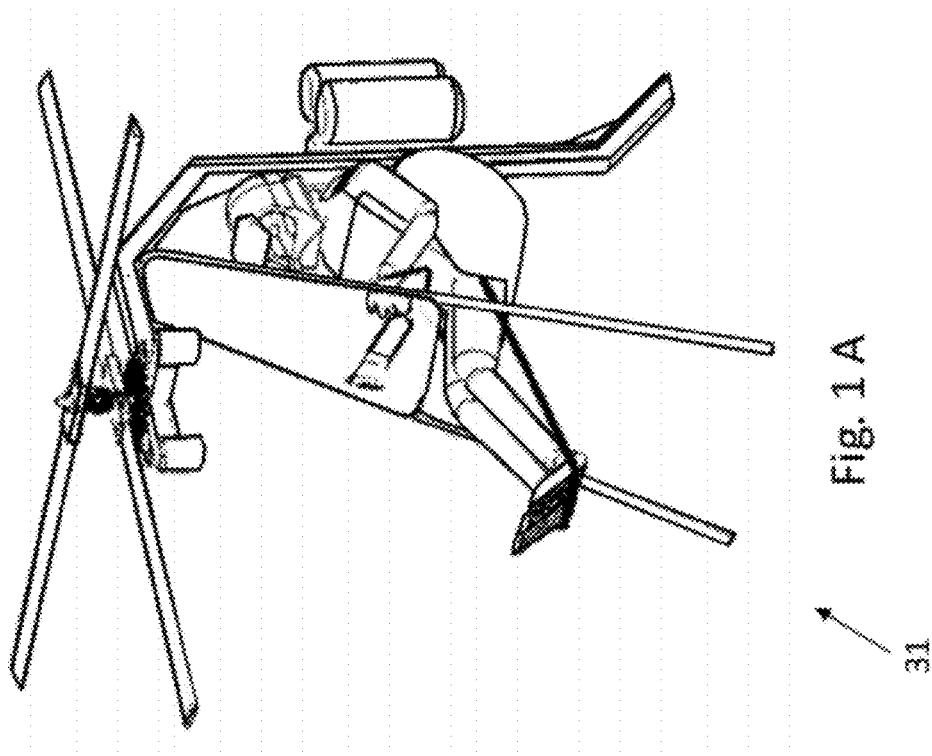
Fig. 1A
Fig. 1

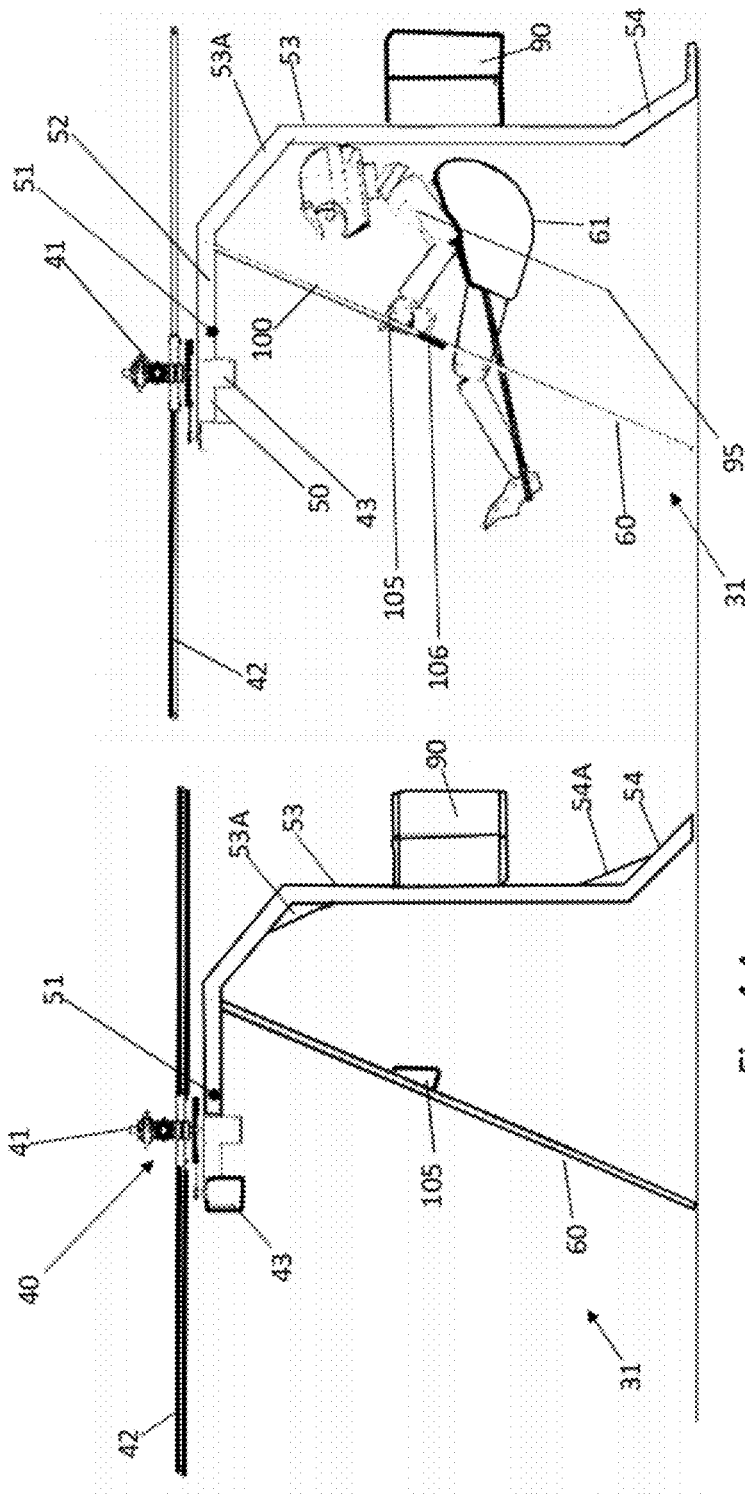
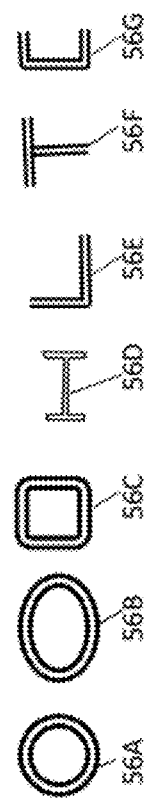
Fig. 4A
Fig. 4B
Fig. 2 B
Repeated
Fig. 4

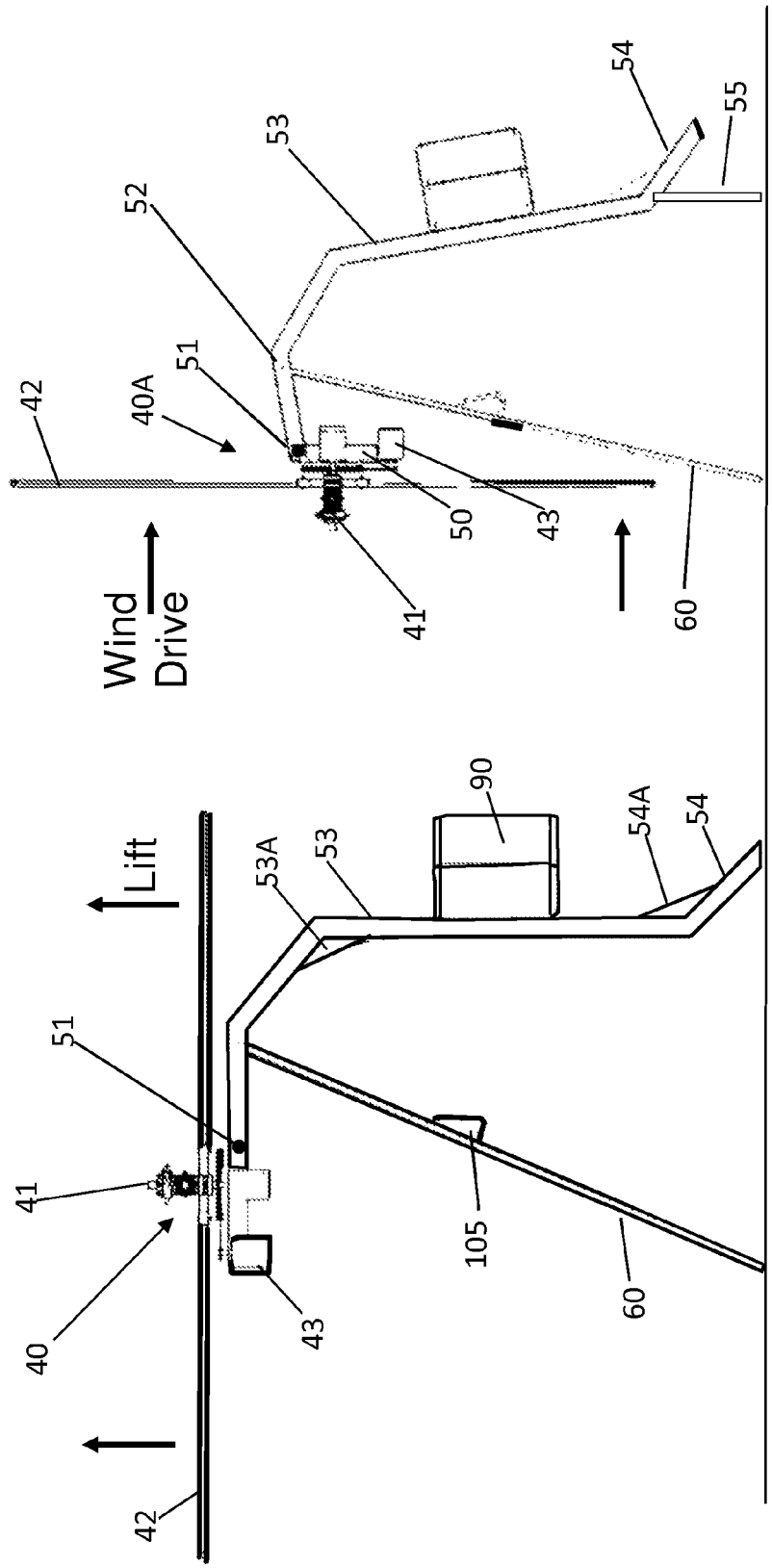

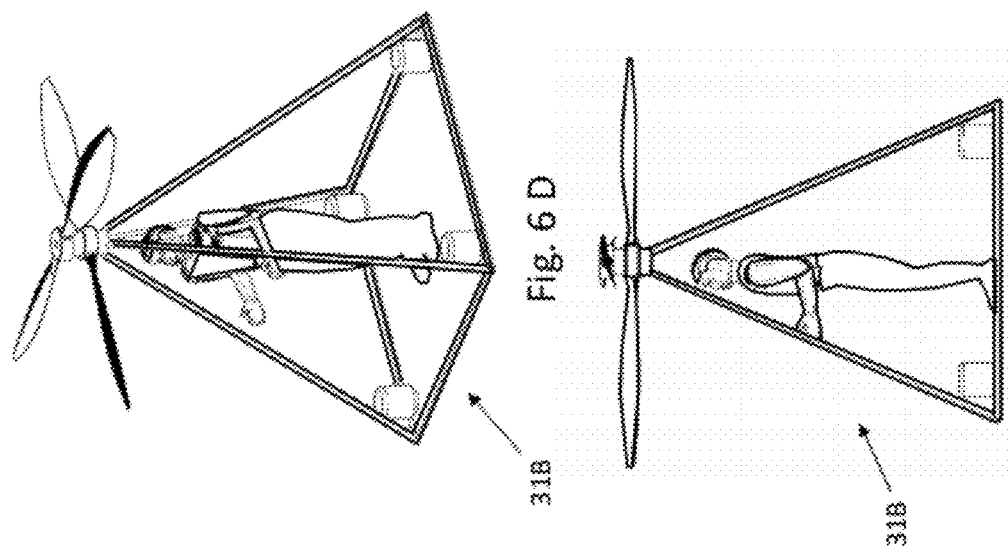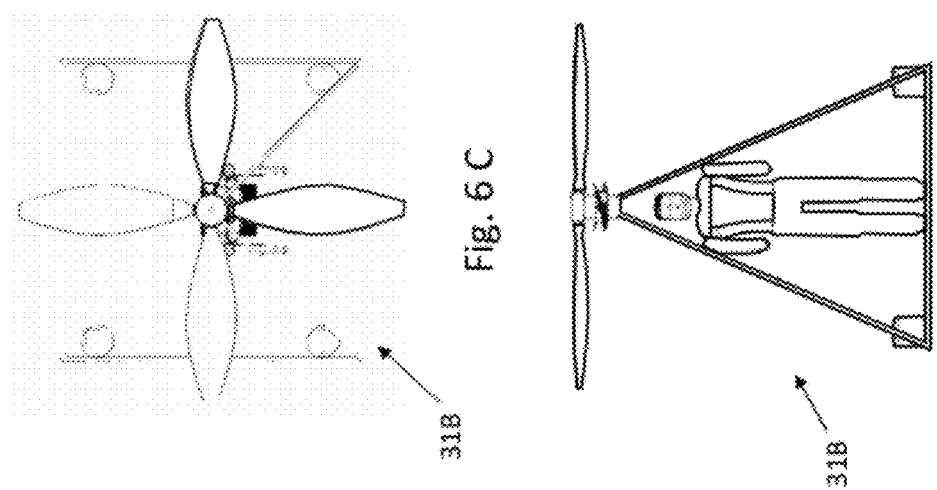

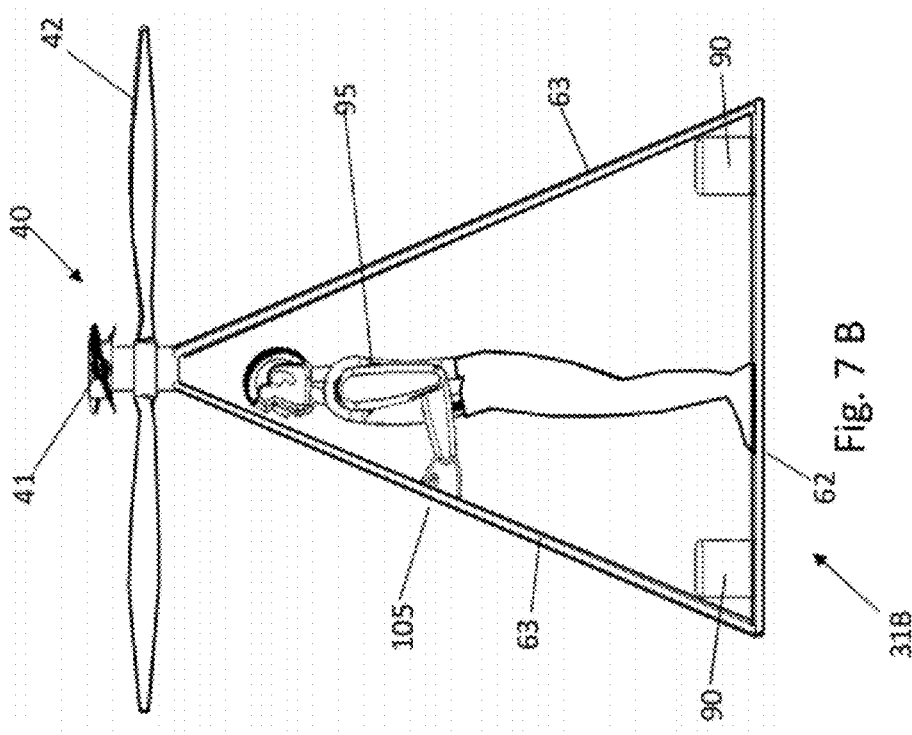
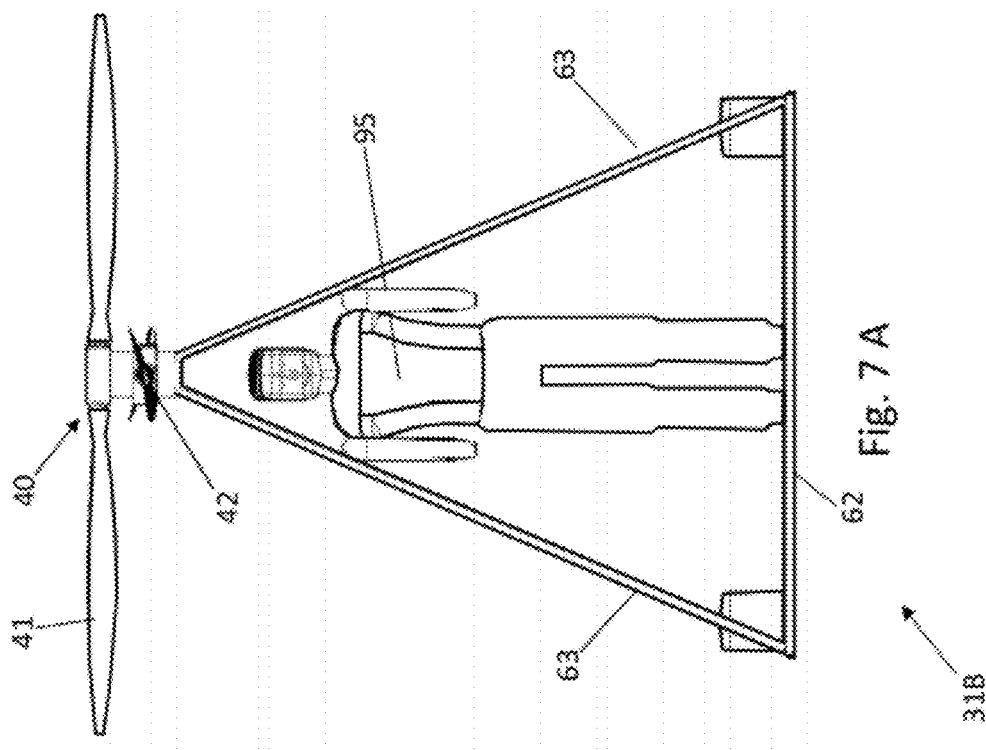
Fig. 7

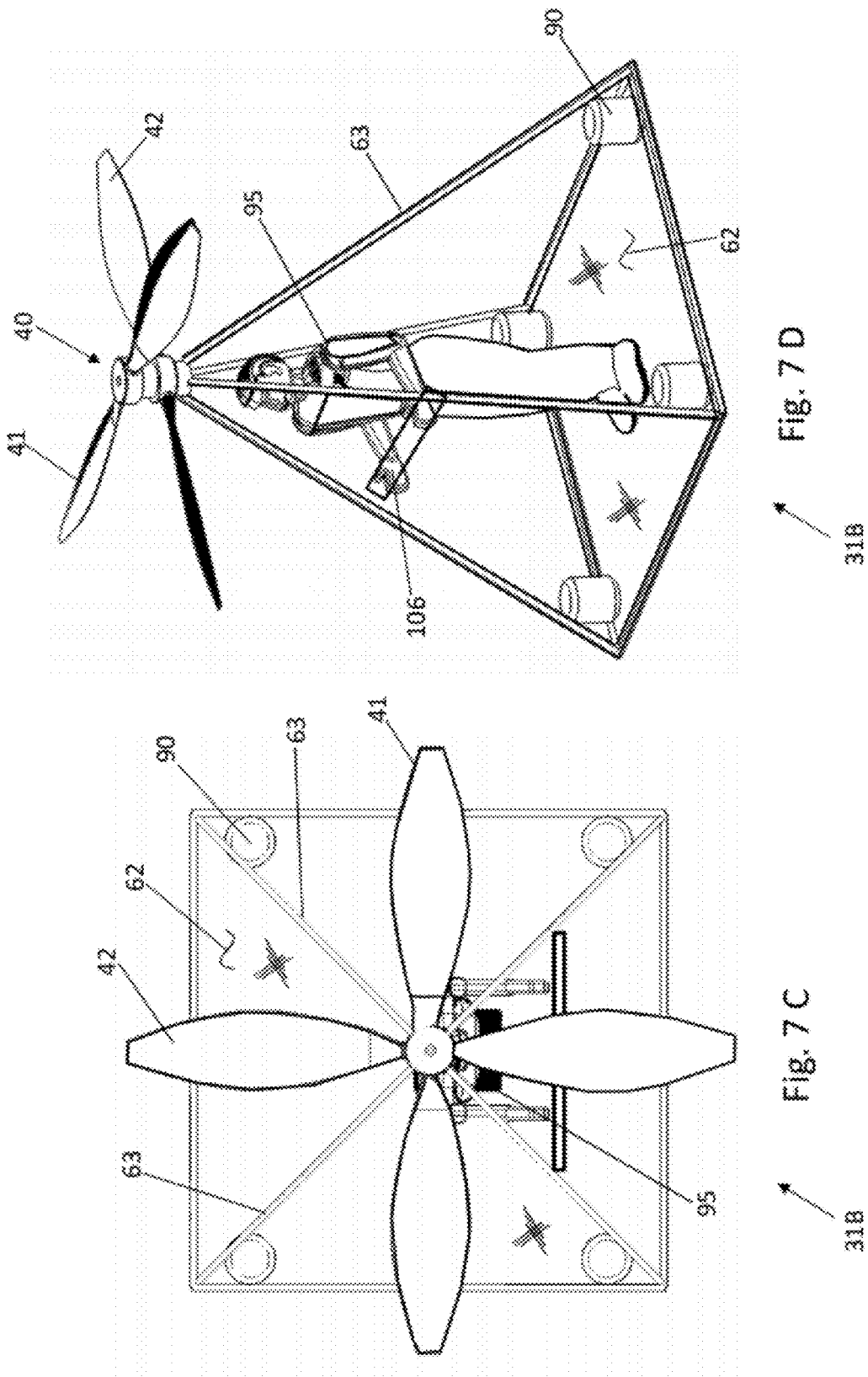

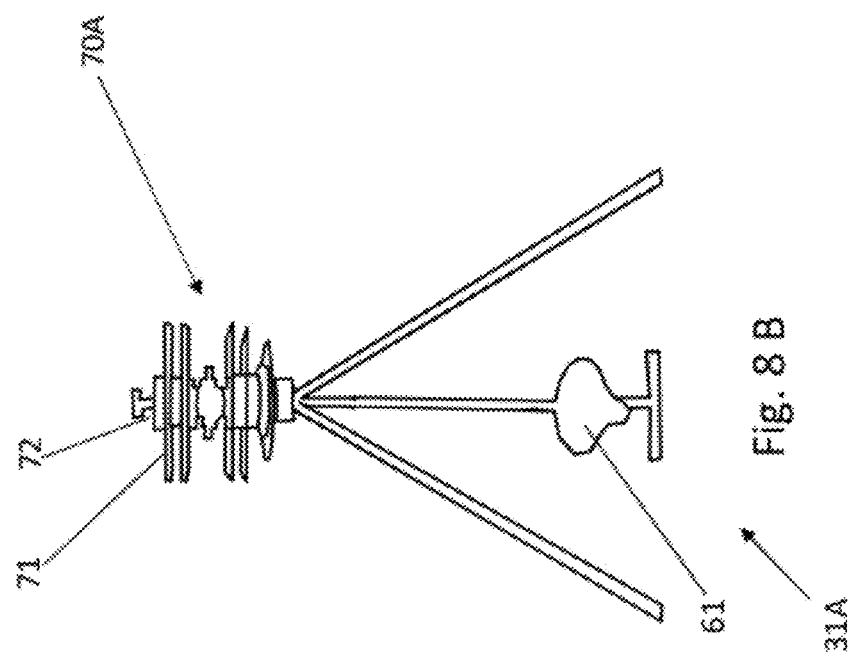
Fig. 8 B
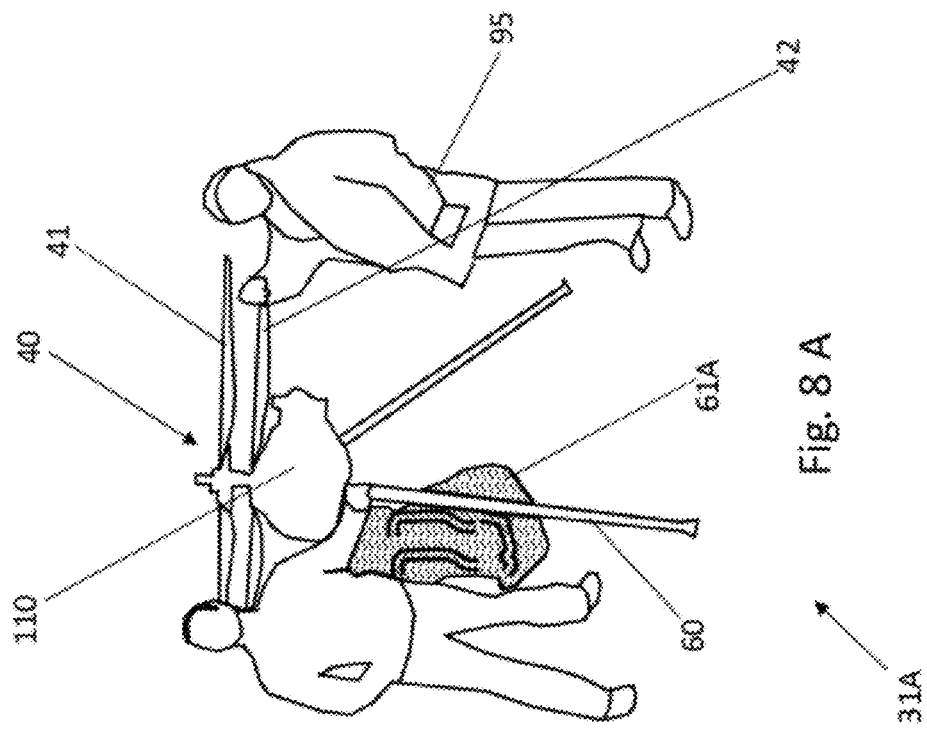
Fig. 8 A
Fig. 8

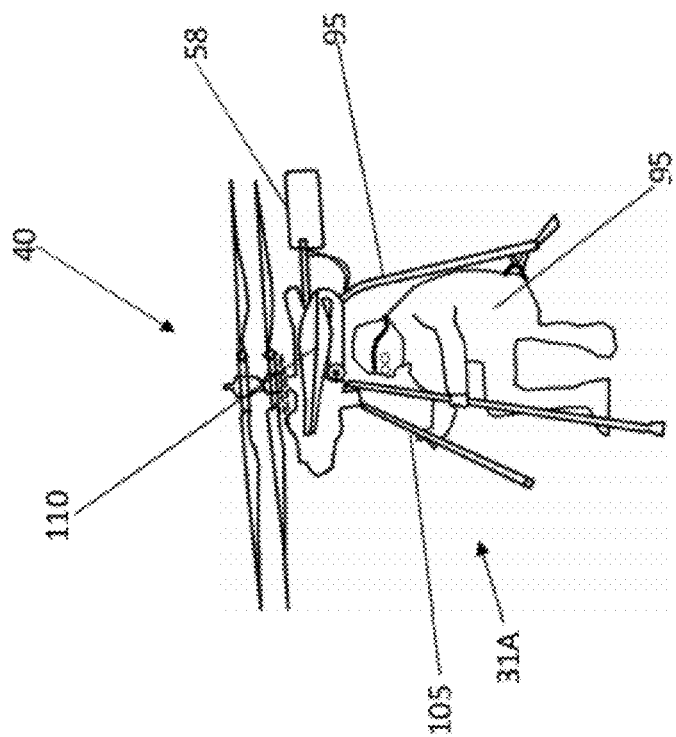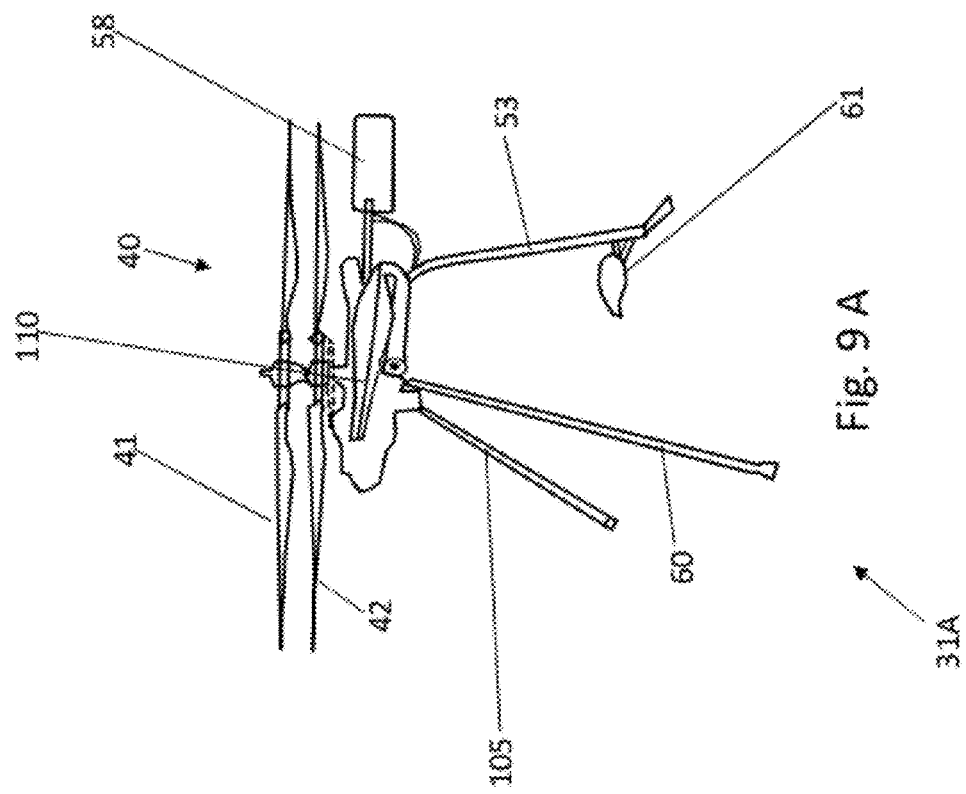

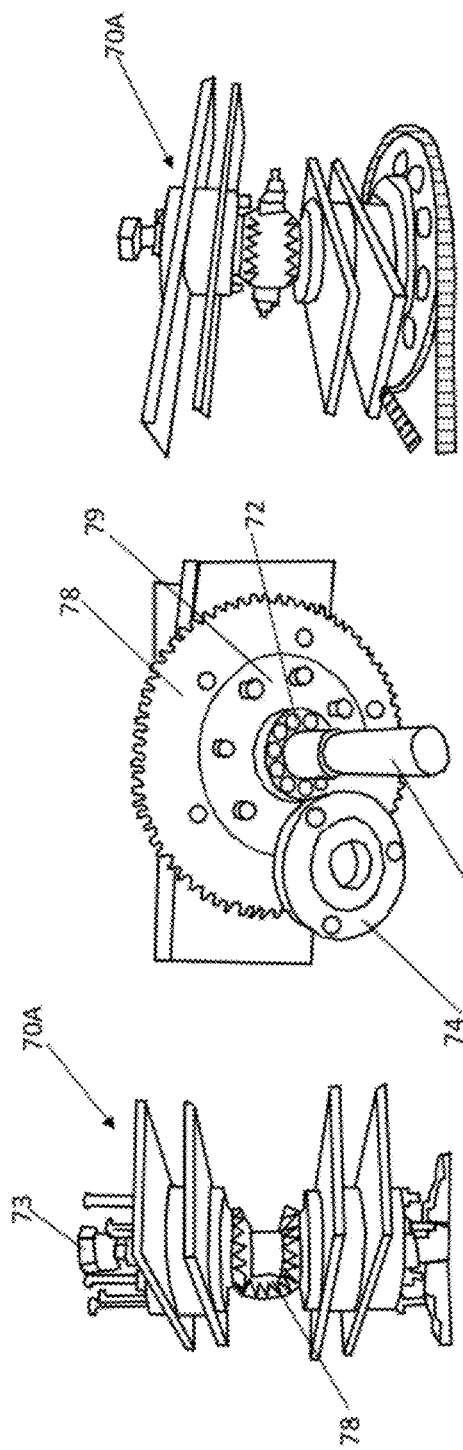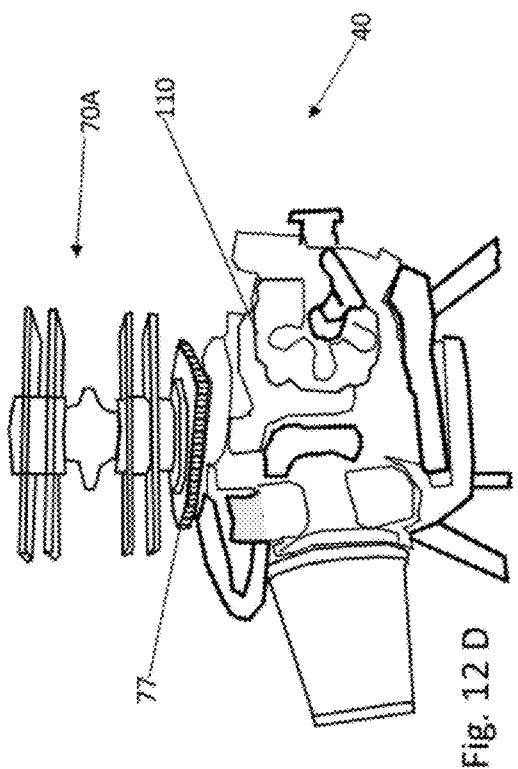
Fig. 12

SPECIAL PERSONAL ELECTRIC HELICOPTER DEVICE WITH INTEGRAL WIND TURBINE RECHARGING CAPABILITY

CROSS-REFERENCE TO RELATED APPLICATIONS

This application claims the benefit of Provisional Patent Application Ser. No. 61/490,343 filed May 26, 2011 by Pete Bitar and entitled "Special Personal Electric Helicopter device with integral wind turbine recharging capability".

FIELD OF INVENTION

This Personal Electric Helicopter device invention relates to powered aircraft. More particularly, the device relates to relatively small, lighter weight powered aircraft capable of vertical take-offs and propulsion across various terrain at low altitudes. The uniqueness and novelty of the device is its capability of re-charging its power source by connection to an electrical grid or by using its uplift components as a wind turbine for re-charging. The device has several optional electro-mechanical control methods.

FEDERALLY SPONSORED RESEARCH

None.

SEQUENCE LISTING OR PROGRAM

None.

BACKGROUND

1. Field of Invention and Prior Art

Problem Solved

Personal electric powered helicopters and other vehicles have long suffered the need to recharge the energy sources. This means some manner to provide the electricity to the batteries or energy cells must either accompany or be present when the energy is depleted. This condition is exacerbated further if the electric vehicle is to be used in a remote location where power generation is non-existent or unreliable. As far as known, there are no Personal Electric Helicopter devices or the like that are functionally equivalent to the Bitar device described in this application. Further none demonstrate the integral wind turbine recharging capability. It is believed that this product is unique in its design and technologies and is neither anticipated by prior art nor obvious to those skilled in the art of electric helicopters and their recharging capability.

2. Prior Art

The earliest development in this technology is a U.S. Pat. No. 2,953,321 that was issued to Robertson et al. in 1960 entitled "Vertical Take-Off Flying Platform'. This revealed an invention generally related to ways and means for propelling a person through the air in controlled flight. More particularly the invention provided a wingless aircraft propelled by thrust reaction and capable of vertical ascent for take-off and climbing, hovering in the air, horizontal flight, and vertical descent under such conditions that directional control, and transitions from vertical to horizontal flight and vice versa are effected by body movements or balance of the pilot flying the machine. This development did not anticipate or relate directly to the Bitar invention and its ability to recharge the energy source. Another U.S. Pat. No. 3,138,350 was issued to Lovett, Jr. in 1964 and entitled "Ducted Fan Aircraft and Engine". The invention demonstrated a ducted fan aircraft and an engine for such an aircraft having an annular configuration so that the pilot may supported centrally within the annular engine. This development did not show or relate directly to the Bitar invention and its ability to recharge the energy source.

A U.S. Pat. No. 5,779,188 was issued to Frick in 1998 entitled "Flight device". This demonstrated a flight vehicle which can be joined and firmly strapped to a load, the load being either a human pilot or a remote-controlled pilot. The flight vehicle comprises a supporting frame for attaching to the load, a driving arrangement incorporating a piston engine, and which is connected directly to the shrouded propeller by means of a rotating drive shaft for the purpose of setting up an air stream, also at least two jet pipes which open into outlet nozzles mounted laterally alongside the load or the human pilot, whereby the said outlet nozzles can be adjusted to change the direction of the discharged air stream. The Frick device did not show a means to recharge the energy system for the flight device. A U.S. Pat. No. 5,842,667 was issued to Jones in 1998 that was entitled "Vertical takeoff and landing mass transit system and method". This demonstrated a device that relates to a mass transit method including a docking terminal where passengers are loaded onto a craft with integral passenger pod. The craft lifts vertically from the docking terminal until it reaches an appropriate commuting altitude within 1,000 feet of the ground at which time the craft will fly to a second docking terminal and vertically descend to the second terminal for unloading of passengers. It fails to anticipate the recharging capability of the Bitar application.

Another U.S. Pat. No. 6,719,244 was issued to Gress in 2004. This was entitled "VTOL aircraft control using opposed tilting of its dual propellers or fans". The technology revealed here shows an invention that relates to improvements with regards to the control of VTOL aircraft that use two propellers or fans as the primary lifting devices in hover. More particularly, the invention is a means for effecting control of the aircraft using just the two propellers alone, and comprises the in-flight tilting of them—which are of the conventional, non-articulated type (though they may have collective blade-pitch)—directly and equally towards or away from one another (and therefore about parallel axes) as necessary for the generation of propeller torque-induced and gyroscopic control moments on the aircraft about an axis perpendicular to the propeller tilt and mean-spin-axes. For a side-by-side propeller arrangement, therefore, their (lateral) tilting towards or away from one another produces aircraft pitch control moments for full control of the aircraft in that direction. Unlike the prior art, no cyclic blade-pitch control, slipstream-deflecting vanes, exhaust nozzles, tail rotors or extra propellers or fans, or conventional control surfaces are needed to effect this aircraft pitch control. In this demonstration, the invention fails to show a recharging capability for the device as does the Bitar system. Another U.S. Pat. No. 6,845,942 was subsequently issued Paul in 2005. This was entitled "Omni-directional air vehicle personal transportation system". This patent revealed an omnidirectional air vehicle having a pod with a connected turbofan system, the pod has a body that contains a power source for generating electrical power and a ducted fan with spherical articulation mechanism having a projecting arm with counter-rotating propellers and a ducted shroud around the periphery of the counter rotating propellers and containing drive motors for electrically driving the propellers. It did not demonstrate a turbine system for recharge as the Bitar system provides.

Next, an U.S. Pat. No. 6,886,776 issued to Wagner, et al. in 2005 is entitled "VTOL personal aircraft". This shows a personal aircraft (PAC) capable of vertical take-off and landing (VTOL) and comprises a fixed wing and a fuselage with a passenger compartment having a front, a rear and two sides, and a plurality of independently powered thrusters, preferably integrated into the wing, on each side of the fuselage. At least one thruster on each side of the fuselage preferably comprises a "levitator" which creates lift from the airfoil-like air inlet as well as from the acceleration of air from inlet to outlet. No regeneration of a charge to the system similar to Bitar was shown. The next technology package was shown in U.S. Pat. No. 6,969,027 that was issued to Ishiba in 2005. This device was entitled "Vertical takeoff and landing apparatus". Here was shown a vertical takeoff and landing apparatus that was reported as excellent in the maneuverability and postural stability of its airframe, served to protect a pilot from an impact when landing, and could purportedly make extremely stable flight when hovering near a building. It shows an airframe that has a propulsion device for generating propulsive force in a vertically upward direction, and a side wall surface surrounding the propulsion device. An air intake port show was reported to have a plurality of divided air intake port sections formed on the side wall surface of the airframe. A duct part shown connects the air intake port sections and the propulsion device with one another. A shutter part that is provided at each air intake port section was for adjusting an amount of air flowing therein. A control unit was show that reportedly adjusts the degree of opening of each shutter part in accordance with an operation of a control stick, so that the airframe can be moved in an arbitrary direction. This development did not anticipate or relate directly to the Bitar invention and its ability to recharge the energy source.

As the technology advances, an U.S. Pat. No. 7,182,295 was next issued to Redmond in 2007. This was entitled a "Personal flight vehicle and system". This invention showed various methods, apparatuses, and systems in which an electric-energy lifting panel levitates a user secured to the electric-energy lifting panel. The electric-energy lifting panel included a first capacitive plate and a second capacitive plate having different geometric dimensions to generate a net-directional force. An ion conditioner ion enhanced air around the first capacitive plate and the second capacitive plate. This invention failed to anticipate or relate directly to the Bitar invention and its capability to recharge the energy source. Next, U.S. Pat. No. 7,364,114 that was issued to Wobben in 2008 was called "Aircraft". Here is shown an invention that concerns an aircraft having a plurality of lifting and thrust rotors, with an electric motor and an inverter for each motor. In order to provide an aircraft having a greater payload, connecting bars are provided between the motors. This development again did not anticipate or relate directly to the Bitar invention and its ability to recharge the energy source.

Finally, an U.S. Pat. No. 7,699,260 as issued to Hughey in 2010. This device is entitled a "Vertical takeoff and landing aircraft using a redundant array of independent rotors". This taught a vertical takeoff and landing aircraft, using for vertical lift and lateral thrust a redundant plurality of essentially similar electrically-powered and electronically-controlled thrust units mounted in a mechanically static or fixed fashion relative to one another in a substantially horizontal plane. The thrust units are shown as situated in this planar array in aerodynamically approximate pairs, such that a complete failure of a single thrust unit would not substantially compromise the ability of the aircraft to maintain flight. Once again, this development did not anticipate or relate directly to the Bitar invention and its ability to recharge the energy source.

SUMMARY OF THE INVENTION

This invention is a Personal Electric Helicopter device with integral wind turbine recharging capability. Taught here are the ways a small, lightweight vertical take-off helicopter may be electrically powered by rechargeable batteries. The battery power may in turn be recharged by connecting the system to an electrical utility grid or generator. As a unique feature, the device may be recharged by transforming the uplift system of the device into a wind turbine. This is accomplished by driving the propellers of the uplift system with available wind and using the resultant electricity to recharge the batteries of the device.

The preferred embodiment of the Personal Electric Helicopter vehicle is a device that is comprised of a rechargeable uplift and propulsion power system with components and features; a frame structure to carry an operator and/or payload; a means for securely connecting the structure to the power system; and a means for controlling the uplift and propulsion system wherein the vehicle may be used to elevate and propel a payload at low altitudes across various terrains and may be positioned to reverse power the wind turbine to recharge the batteries.

The newly invented Personal Electric Helicopter device with integral wind turbine recharging capability may be manufactured at low volumes by very simple means and in high volume production by more complex and controlled manufacturing systems.

OBJECTS AND ADVANTAGES

There are several objects and advantages of the Personal Electric Helicopter device with an integral wind turbine recharging capability. There are currently no personal aircraft known that are effective at providing the objects of this invention. The Personal Electric Helicopter device:
  permits the operator to easily transport and propel himself and a payload at low altitudes across various terrains;
  provides an unique remote recharge of the power source so that a return trip or further transport is possible;
  may be controlled with a remote control and be a drone helicopter device for payloads; and
  reduces the dependence on petroleum replenishment in remote locations for electrical generation.

Finally, other advantages and additional features of the present Personal Electric Helicopter vehicular device will be more apparent from the accompanying drawings and from the full description of the device. For one skilled in the art of aircraft and electrical propulsion systems for vehicles, it is readily understood that the features shown in the examples with this product are readily adapted to other types of electrically propelled aircraft and similar systems and devices.

DESCRIPTION OF THE DRAWINGS—FIGURES

The accompanying drawings, which are incorporated in and constitute a part of this specification, illustrate an embodiment of the Special Personal Electric Helicopter device with an integral wind turbine recharging capability.

The drawings together with the summary description given above and a detailed description given below serve to explain the principles of the Special Personal Electric Helicopter device. It is understood, however, that the device is not limited to only the precise arrangements and instrumentalities shown.

FIGS. 1A and 1B are sketches of the general Personal Electric Helicopter device and a prototype of the device.

FIG. 4 are sketches of a side view in FIG. 4A of the Personal Electric Helicopter device in the fly mode, a repeat for reference of the manned device in the fly mode, both sketches having components and features shown, and structural configurations in FIG. 4B.

FIG. 5 are sketches of FIG. 4A of the Personal Electric Helicopter device in the fly mode and a repeat of FIG. 3A of the device shown in the charge mode for a side-by-side comparison of the device.

FIGS. 6A through 6D are general sketches of an alternative embodiment of the Personal Electric Helicopter device in a "stand-up" operator configuration.

FIGS. 7A through 7D are front, side, isometric and top views of the alternative embodiment of the Personal Electric Helicopter device with components and features noted.

FIGS. 8A and 8B are views of a prototype of the Personal Electric Helicopter device with general features and components noted.

FIGS. 9A and 9B are additional views of a prototype of the Personal Electric Helicopter device with general features and components noted.

FIGS. 12A through 12D are views of a gas powered prototype of the general uplift means of Personal Electric Helicopter device with general features and components noted.

DESCRIPTION OF THE DRAWINGS—REFERENCE NUMERALS

Figure 2:
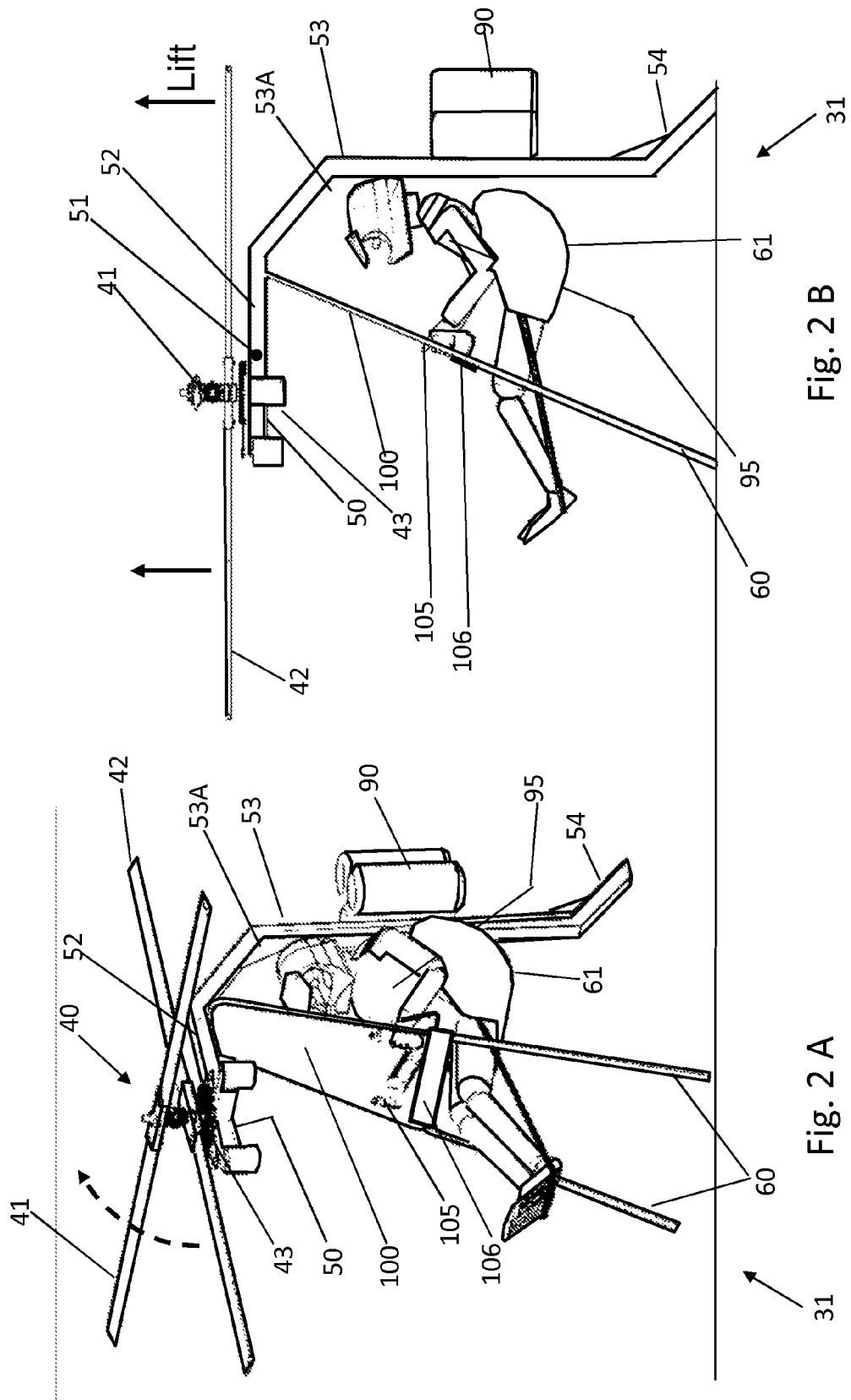
FIGS. 2A and 2B are isometric and side view sketches of the Personal Electric Helicopter device manned by an operator and with components and features noted.
Figure 3:
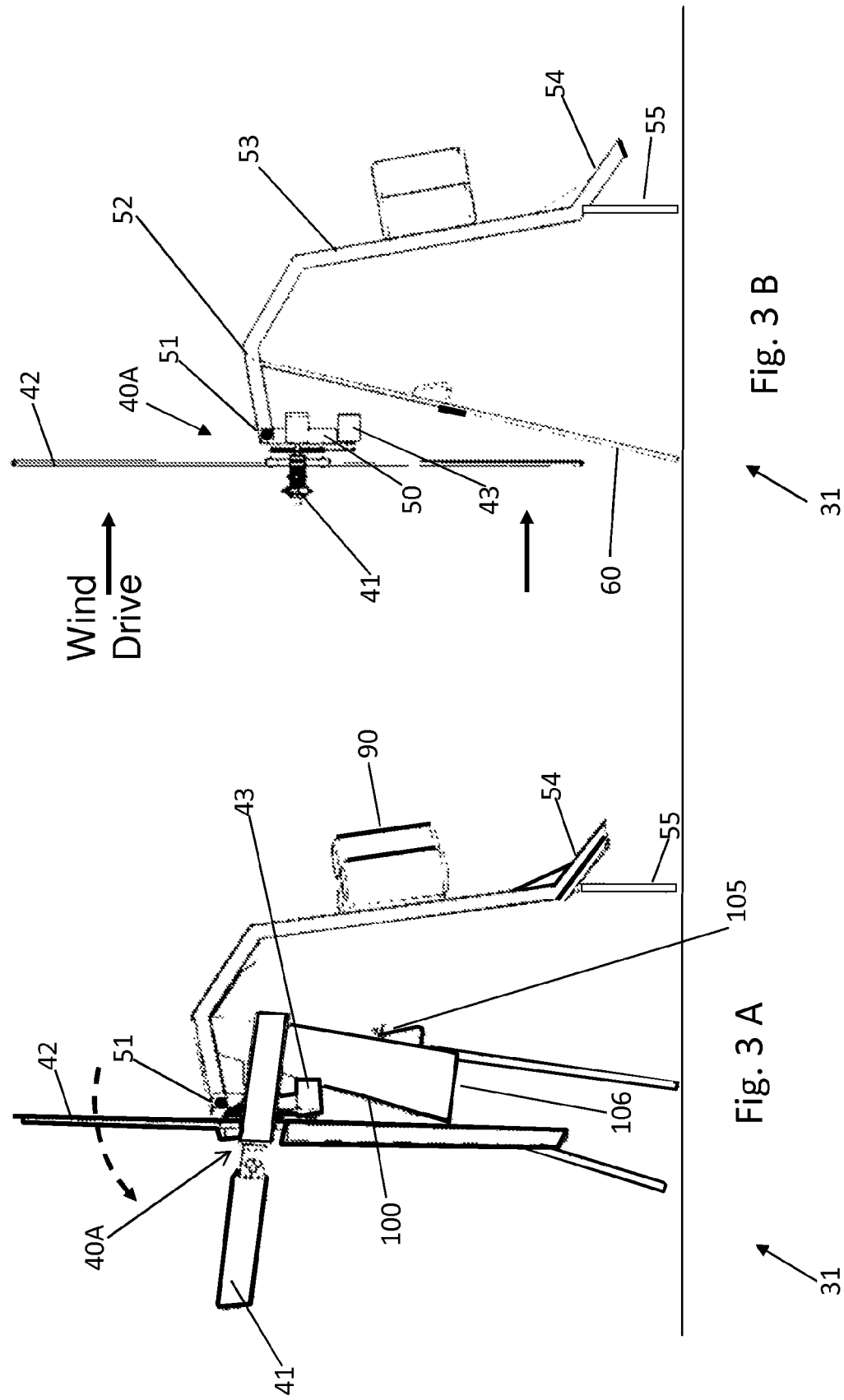
FIGS. 3A and 3B are isometric and side view sketches of a Personal Electric Helicopter device in the unique remote charging mode with the components and features shown from generally a top view.

The following list refers to the drawings:

TABLE B

| Ref # | Description |
|---|---|
| | Reference numbers |
| 31 | Personal Electric Helicopter device in the preferred sit down embodiment |
| 31A | Prototype of the Personal Electric Helicopter device in the preferred sit down embodiment |
| 31B | Personal Electric Helicopter device in the alternative stand-up embodiment |
| 40 | General means for uplifting the Personal Electric Helicopter device |
| 40A | General means for uplifting the Personal Electric Helicopter device positioned to a charging mode to act as a wind collector to drive the motor or motor-generator |
| 41 | Top propeller assembly |
| 42 | Bottom propeller assembly |
| 43 | Means for driving propeller - electric batteries; gas or petro fuels; other(fuel cell) |
| 50 | Motor mount structure |
| 51 | Structural hinge means |
| 52 | Top frame structure/member (various cross sections - tubes, angle/I C etc. and various materials - steel, steel alloys, titanium, aluminum; composite metals, etc. |
| 53 | Back support frame structure/member |
| 53A, 54A | Structural gusset/reinforcements |
| 54 | Bottom(foot) structural means |
| 55 | Adjustable leveling leg |
| 56A | tubular round |
| 56B | tubular oval |
| 56C | square or rectangular |
| 56D | "I" or wide flange 56D ("W" or "H") |
| 56E | angles |
| 56F | Tees |
| 56G | Channel "C's" |
| 58 | Tail/rudder/means to direct/yaw control |
| 60 | Front structural support |
| 61 | Operator seat |
| 61A | Operator seat with safety straps |
| 62 | Operator platform |
| 63 | Side structural support |
| 70 | Blade/propeller mounting system |
| 70A | Prototype blade mounting system |
| 71 | Blade/propeller intermediate structural mounts |
| 72 | Bearings for blades to rotate around fixed shaft 72 |
| 73 | Secured/non-moving/non-rotating shaft |
| 73A | Hollow void/aperture through shaft |
| 74 | Blade mount to bearing coupler and/or clutch |
| 75 | Retention collar for motor and battery mount |
| 76 | Motor or motor generator (MG set) means to transfer motion (i.e. output) to external device - means such as shaft with gears, pulleys etc. |
| 77 | Means to transfer motion (such as a chain, belt, rope, direct drive gears, beveled gears, or the like |
| 78 | Driven gear/sprocket or the like |
| 79 | Means to mount driven gear 78 around shaft 73 |
| 80 | Motor |
| 81 | Motor generator |
| 83 | Motor generator conversion (AC or DC current to DC current) and controls black box non specific . . . FETS, SCR, etc. |
| 85 | Motor and battery mount(s) and motor-generator and battery mounts |
| 90 | Storage batteries |
| 95 | Craft operator |
| 100 | Vehicle windshield |
| 105 | Vehicle means for hand control |
| 106 | Optional control panel/console black box nonspecific well known to those skilled in the art of electrical and electronic control systems |
| 107 | Speed controller wiring |
| 108 | Remote controller receiver and controls black box nonspecific . . . well known to those skilled in the art of electrical and electronic remote control systems |
| 110 | Prototype try-out gas engine or equal |

DETAILED DESCRIPTION OF PREFERRED EMBODIMENT

The present device is a Personal Electric Helicopter device with an integral wind turbine recharging capability. More particularly, the device relates to relatively small, lighter weight aircraft capable of vertical take-offs and propulsion across various terrain at low altitudes. The device is capable of re-charging its power by connection to an electrical grid or by using its uplift components as a wind turbine for re-charging.

Taught here are the ways a small, lightweight vertical take-off helicopter may be electrically powered by rechargeable batteries. The battery power may be recharged by connecting the system to an electrical utility grid or generator. As an unique feature, the device may be recharged by transforming the uplift system of the device into a wind turbine. This is accomplished by driving the propellers of the uplift system with available wind and using the resultant electricity to recharge the batteries of the device.

The advantages for the Personal Electric Helicopter device 31 are listed above in the introduction. Succinctly the benefits are that the Personal Electric Helicopter device:

permits the operator to easily transport and propel himself and a payload at low altitudes across various terrains;

provides an unique remote recharge of the power source so that a return trip or further transport is possible;

may be controlled with a remote control and be a drone helicopter device for payloads; and reduces the dependence on petroleum replenishment in remote locations for electrical generation.

The preferred embodiment of the Personal Electric Helicopter vehicle is a device with an integral wind turbine recharging capability that is comprised of a rechargeable uplift and propulsion power system with components made of durable, lightweight materials and features; a frame structure made of a durable, light weight material to carry an operator and/or payload; a means for securely connecting the structure to the power system; and a means for controlling the uplift and propulsion system wherein the vehicle may be used to elevate and propel a payload at low altitudes across various terrains and may be positioned to reverse power the wind turbine to recharge the batteries.

There is shown in FIGS. 1-12 a complete description and operative embodiment of the Personal Electric Helicopter device. In the drawings and illustrations, one notes well that the FIGS. 1-12 demonstrate the general configuration and use of this product. The various example uses are in the operation and use section, below.

The accompanying drawings, which are incorporated in and constitute a part of this specification, illustrate an embodiment of the Personal Electric Helicopter device 31 that is preferred. The drawings together with the summary description given above and a detailed description given below serve to explain the principles of the device 31. It is understood, however, that the Personal Electric Helicopter device 31 is not limited to only the precise arrangements and instrumentalities shown. Other examples of vertical takeoff aircraft and helicopters devices and uses are still understood by one skilled in the art of electrical vehicles, aircraft, wind turbines and such to be within the scope and spirit shown here.

FIG. 1A is a sketch of the general Personal Electric Helicopter device 31. The components, features, and alternative embodiments of the device are described in detail below.

FIG. 1B; FIGS. 3A and 3B; FIG. 5; and FIGS. 9A and 9B are described below as part of the operation and use of the Personal Electric Helicopter vehicle device.

FIGS. 2A and 2B are isometric and side view sketches of the Personal Electric Helicopter device 31 manned by an operator 95 and with components and features noted. The general means of uplifting 40 is shown comprise of a drive means 40 such as a motor 43 or the like, a support 50, and at least one propeller 41, 42. The uplift means 40 is connected integrally to a frame structure comprised of a series of more than one section of a frame structure comprised of top frame 52, back frame 53, and bottom structure 54 such as shown. This structure may be reinforced by gussets 53A, 54A or other reinforcement means and the components made of durable, lightweight materials. In the present embodiment one at least one battery 90 is provided that powers the motor 43. The battery(ies) 90 are connected through cables (not shown) that provide energy to the motor 43. The frame system embodied here shows two front supports 60. Removably connected to the supports 60 are the hand controls 105 and optional windshield 100 and an optional console 106. One skilled in vehicles, especially aircraft and helicopters appreciates the many and varied controls that will be necessary to control the battery 90/motor 43 and propeller(s) 41, 42 of the uplift sub-system 40. In this embodiment, the operator 95 is situated on an integral seat 61. The isometric and side views (FIGS. 2A and 2B) show the overview of the Personal Electric Helicopter device 31. Further details and features are described below.

FIG. 4 are sketches of a side view in FIG. 4A of the Personal Electric Helicopter device 36 in the fly mode and repeat for reference of the manned device in the fly mode, both sketches having components and features shown. The components were identified above. Shown and depicted are the structural frame piece 50, 52, 53, 54, and 60. These frame structures may be of a variety of configurations. For example and not as a limitation, the structures may be tubular (round 56A, oval 56B, square 56C, rectangular or other regular or non-regular polygonal cross-sections); the structures may be angles 56E, Channel "C's" 56G Zees, Tees 56F, "I" or wide flange 56D ("W" or "H") or other cross-sections not specifically identified. Some of these examples of structural configurations are shown in FIG. 4B. The durable materials of which the frame is made is for example and not limitation may be a metal like steel, a steel alloy, aluminum, titanium; a composite material; a high strength, reinforced plastic, or any other light weight, durable material with sufficient strength to support the drive, operator and payload. The propellers may be a metal such as steel, steel alloy, aluminum, titanium; a composite material; a reinforced and high strength plastic; a wood laminate, or other durable, light weight yet sufficiently strong material. Propellers 41, 42 are well known in the art of aircraft and may be selected from a plethora of styles and materials. The other components such as the seats 61, platforms 62, windshields 100 and consoles 106 are likewise expected to be of lightweight, strong and durable materials shaped to appropriate configurations.

FIGS. 6A through 6D are general sketches of an alternative embodiment of the Personal Electric Helicopter device 31B in a "stand-up" operator configuration.

FIGS. 7A through 7D are front, side, isometric and top views of the alternative embodiment of the Personal Electric Helicopter device 31B with components and features noted. The device shows side structures 63 and a bottom platform 62. These are similar in configuration and materials as the structures 52, 53, et al. described for the preferred embodiment 31. One notes that in this alternative, the battery(ies) 90 are near the bottom standing platform 62. One skilled in aircraft structure appreciates that this shifts the center of gravity of the vehicle and pay load (and operator) but sacrifices length of the power cables needed to connect the batter(ies) 90 to the motor(s) 43.

FIGS. 8A and 8B are views of a prototype 31A of the Personal Electric Helicopter device 31 with general features and components noted. FIG. 8A shows the prototype 31A has a tryout gas engine 110 shown coupled to the propellers and uplift structure 40. The operator 95 and inventor look on to the overall prototype 31A with a seat 61A and structural members 60. FIG. 8B shows the prototype propeller mounting system 70A with the propeller intermediate structural mount 71 and the bearings 72. The intermediate structural mount 71 and system 70, 70A are made of light weight, and durable strong metals or composite materials. The Bearings 72 are high speed aircraft bearings well known to those in the aircraft and helicopter fields.

Figure 10:
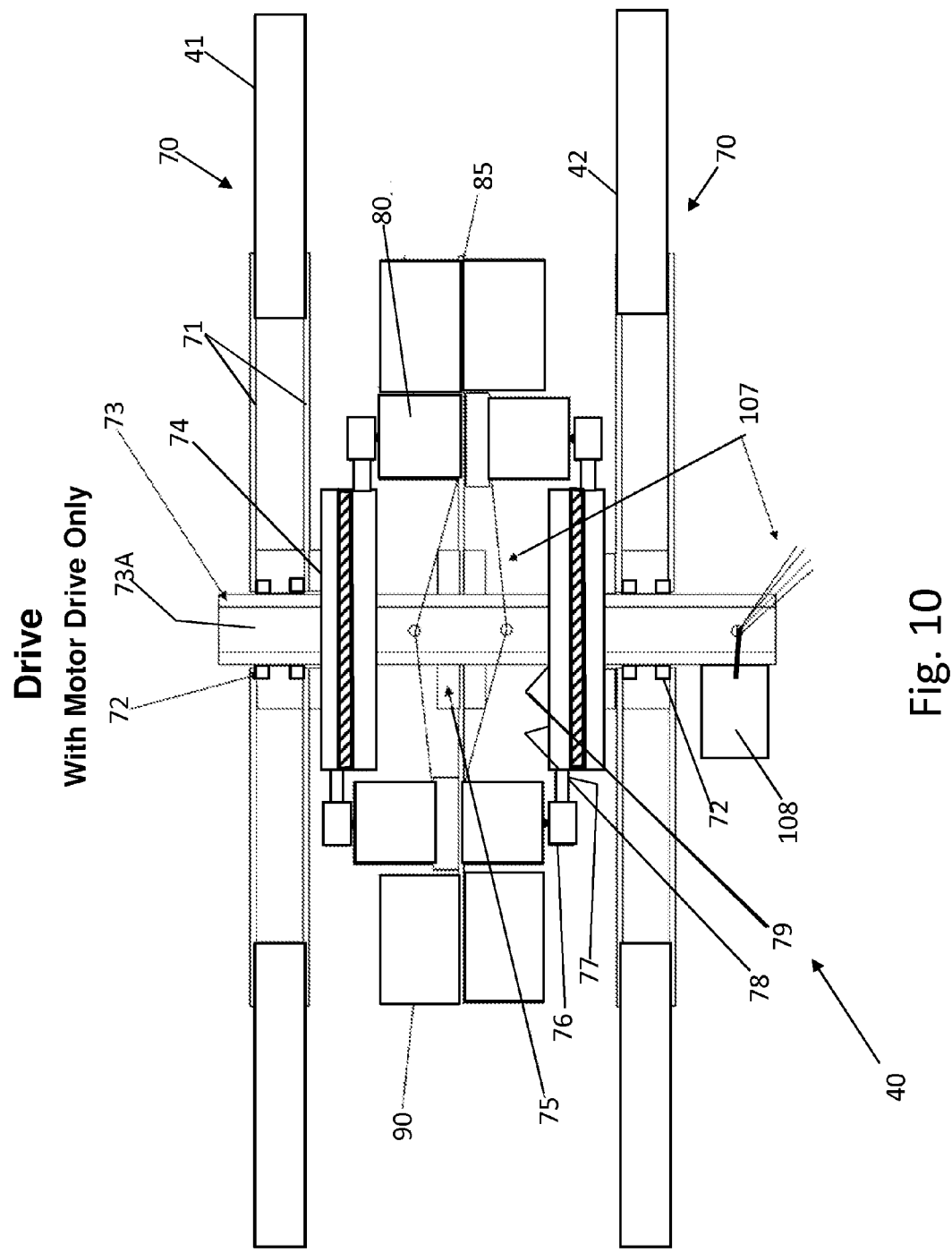
FIG. 10 is a sketch of the general Non-coaxial drive uplift means for the Personal Electric Helicopter device with general features and components noted.

FIG. 10 is a sketch of the general Non-coaxial drive uplift means 40 for the Personal Electric Helicopter device 31 with general features and components noted. is the propeller mount system 70 with the propellers 41, 42 connected through the intermediate structural mount 71 and coupled to the bearings 72. The bearings 72 are in turn coupled to the coupler 74 (with clutch capabilities and synchronous components for multiple drives that comprise a means for driving) to the driven gear 78 and shaft clearance or bushing 79. In turn the driven gear 78 has power transferred from the motor 42 through the motor shaft/gear-couple 76 and the connector/drive chain 77. The embodiment shown with the prototype is a combination of sprockets, chains and gears. However, these are exemplary and lot limitations to other means which are well within the spirit and scope of the full embodiment of the device 31. The entire propeller driven system, as just described rotates around the fixed shaft 73 which has an aperture (hollow opening) 73A throughout its center. The various control wiring 105 are guided within the opening 73A. Also a mount 85 for the motor(s) 80 and battery(ies) 90 are retained by a collar 75 to the shaft 73. Thereby the battery(ies) 90 are connected through cables (not shown) to the motor(s) 80. The electric power from the battery powers the motor 80 which transduces the stored electrical energy into kinetic energy and rotational power. This power is further transferred to the propellers 41, 42 through the system shown or a functional equivalent. The motors/battery system may have relatively simple controls as one skilled in the art of electromechanical power systems well appreciates. An optional remote control system 108 may be employed for using the device 31 as a drone, non-human pilot controlled aircraft if desired. This remote system 108 is well known to those skilled in the art of electrical and electronic remote control systems.

Figure 11:
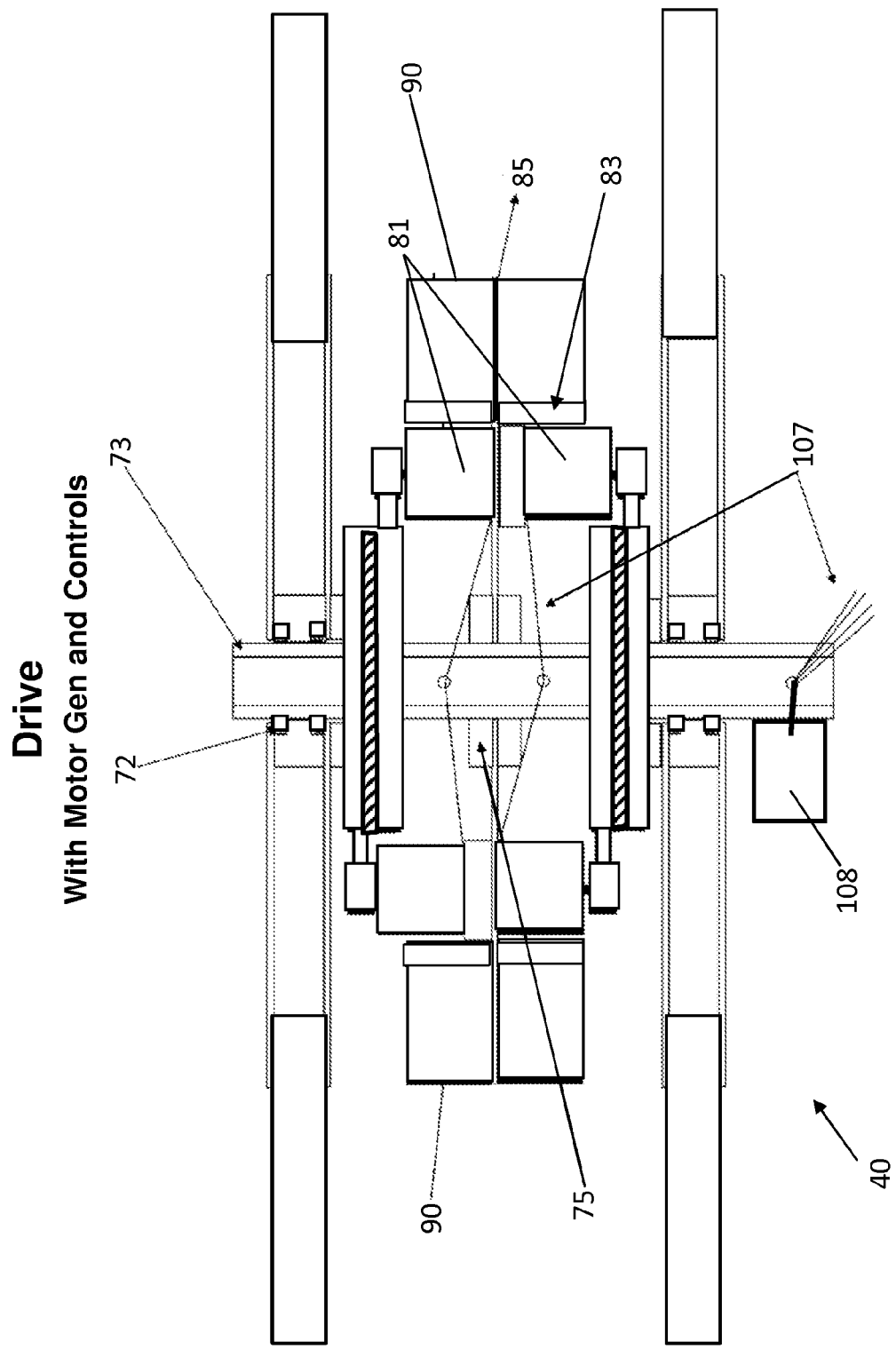
FIG. 11 is a sketch of the general Non-coaxial drive uplift means serviced with a motor generator for the Personal Electric Helicopter device with general features and components noted.

FIG. 11 is a sketch of the general Non-coaxial drive uplift means serviced with an alternative motor generator 81 system for the Personal Electric Helicopter device 31 with general features and components noted. Here the system shows a motor generator 81 option with converter controls 83. The motor generator 81 or an equivalent motor 80 variation permits the drive system 40 to be reversed. The propellers 41, 42 then become a drive and take kinetic energy from the ambient wind, transfer it to rotational motion of the propellers which in turn drive the system to turn the motor 80 or motor generator 81 and generate electricity to charge the battery(ies) 90. Anticipated in the electromechanical drive and charging system are some variation of a control/conversion system 83 with Silicon Controlled Rectifiers (SCRs) and/or Field Effect Transistors (FETs). This type of control is well known to those skilled in the art of electrical and electronic control systems for electromechanical devices.

FIGS. 12A through 12D are views of a gas powered 110 prototype 31A of the general uplift means 40 of Personal Electric Helicopter device with general features and components noted. The individual components are shown for the prototype 31A and have been described above.

The details mentioned here are exemplary and not limiting. Other specific components and manners specific to describing a Personal Electric Helicopter device with an integral wind turbine recharging capability may be added as a person having ordinary skill in the field of aircraft and electrical propulsion systems for well appreciates.

OPERATION OF THE PREFERRED EMBODIMENT

The Personal Electric Helicopter device with an integral wind turbine recharging capability has been described in the above embodiment. The manner of how the device operates is described below. One notes well that the description above and the operation described here must be taken together to fully illustrate the concept of the Personal Electric Helicopter device. The preferred embodiment of the Personal Electric Helicopter vehicle is a device that is comprised of a rechargeable uplift and propulsion power system with components and features; a frame structure to carry an operator and/or payload; a means for securely connecting the structure to the power system; and a means for controlling the uplift and propulsion system wherein the vehicle may be used to elevate and propel a payload at low altitudes across various terrains.

The Personal Electric Helicopter device 31 operates as a light weight and simply controlled aircraft device. When in the fly mode, the operator or remote control device controls the output power to the motor and any pitch control to the propellers. The operator or remote also controls the rudder or yaw control means 58. The charging system is described below.

FIG. 1B is a prototype 31A of the Personal Electric Helicopter device 31.

FIGS. 3A and 3B are isometric and side view sketches of a Personal Electric Helicopter device 31 in the unique remote charging mode with the components and features shown. In the charging means, the device 31 is simply transformed by lowering the propeller system 40 to a vertical position by means of the hinge point 51. Also the device 31 is adjusted by the support leg 55 to ensure a good vertical positioning to best catch the ambient wind. The kinetic energy of the wind rotates the propellers and as the propeller rotate, they turn the drive system such that the shaft of the motor 80 or motor generator 81 is rotates and passes the magnetic field to the (stator) field and thus creates electricity. The electricity charges the battery(ies) 90 with any conversion (if necessary) through the controls 83. All other components shown have been described above.

FIG. 5 are sketches of FIG. 4A of the Personal Electric Helicopter device in the fly mode and a repeat of FIG. 3A of the device shown in the charge mode for a side-by-side comparison of the device 31 in each position. The uplift system is hinged and moves about the hinge point 51 as shown.

FIGS. 9A and 9B are additional views of a prototype of the Personal Electric Helicopter device with general features and components noted. Here the rudder 58 is shown clearly. Also, in FIG. 9B the prototype 31A is shown with a try-out gas engine 110 and also is shown with an operator 95 as the device 31 is tethered and the uplift system empirically tested.

Many uses are anticipated for Personal Electric Helicopter device. Some examples, and not limitations, are shown in the following Table.

| ITEM | DESCRIPTION |
|---|---|
| 1 | Short range personal |

| ITEM | DESCRIPTION |
|---|---|
| | transportation |
| 2 | Emergency/disaster relief |
| 3 | Fire watch |
| 4 | Military assist (sniper, recon, etc.) |
| 5 | Remote control with medium payload - 250-500 lbs. |
| 6 | Military and Homeland security sighting needs for security operations |
| 7 | Communications Power base - Recharge capability remote from grid |

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

With this description it is to be understood that the Personal Electric Helicopter device with an integral wind turbine recharging capability is not to be limited to only the disclosed embodiment of product. The features of the Personal Electric Helicopter device are intended to cover various modifications and equivalent arrangements included within the spirit and scope of the description.

What is claimed is:

1. A Personal Electric Helicopter (PEH) vehicle device comprised of:
   (a) an electric battery powered system including at least one rechargeable electric battery, the powered system further comprising at least one motor-generator wherein the at least one motor-generator provides rotational power to a propeller for uplift and propulsion and the powered system made of lightweight and durable materials;
   (b) a frame structure made of a lightweight, durable and hollowed tube material, the structure configured to carry an operator and payload and the frame structure including at least three inclined tubes converging toward the powered system at a one converging end and including an operator seat secured to at least one of the three inclined tubes at the opposite end of the one converging end;
   (c) a means for securely connecting the frame structure at the one converging end to the electric battery powered system;
   (d) the means for securely connecting the frame structure to at the one converging end to the electric battery powered system further comprising a hinge mechanism wherein, when the device is at rest and not flying, the hinge mechanism of the frame permits the electric battery powered system and the propeller to be rotated to an essentially vertical position to accept a wind force for the propeller to reverse the direction of rotational turning and to propel the motor-generator in order to recharge the at least one battery;
(e) a means for controlling the electric battery powered system for uplift and propulsion;
(f) a means for controlling the direction of propulsion of the Personal Electric Helicopter (PEH) vehicle device;
(g) the at least one propeller; and
(h) a mechanical drive connection from the rechargeable electric battery powered system and the at least one propeller wherein the (PEH) vehicle can be used to elevate and propel the operator/payload at low altitudes across various terrains.

2. The device according to claim 1 wherein the means for controlling the electric battery powered system for uplift and propulsion is an electronic conversion system with a set of Silicon Controlled Rectifiers (SCRs) and/or a set of Field Effect Transistors (FETs).

3. The device according to claim 1 further comprising a second propeller driven by the electric battery powered system.

4. The device according to claim 3 wherein the one propeller and the second propeller are reversible and rotate in an opposite direction wherein the one propeller and the second propeller in turn drive the motor generator and generate electricity to charge the battery.

5. The device according to claim 1 wherein the means for controlling the electric battery powered system for uplift and propulsion is a remote control system.

6. The device according to claim 1 wherein the means for controlling the direction of propulsion is a single rudder.

* * * * *